(12) United States Patent
Ranbro

(10) Patent No.: US 10,136,100 B2
(45) Date of Patent: Nov. 20, 2018

(54) METHOD AND DEVICE IN A CAMERA NETWORK SYSTEM

(71) Applicant: Axis AB, Lund (SE)

(72) Inventor: Mikael Ranbro, Eslov (SE)

(73) Assignee: Axis AB, Lund (SE)

(*) Notice: Subject to any disclaimer, the term of this patent is extended or adjusted under 35 U.S.C. 154(b) by 62 days.

(21) Appl. No.: 15/499,403

(22) Filed: Apr. 27, 2017

(65) Prior Publication Data

US 2017/0332041 A1    Nov. 16, 2017

(30) Foreign Application Priority Data

May 16, 2016 (EP) ..................... 16169770

(51) Int. Cl.
| | |
|---|---|
| H04N 7/035 | (2006.01) |
| H04N 5/217 | (2011.01) |
| H04N 5/232 | (2006.01) |
| H04N 5/235 | (2006.01) |
| H04N 7/18 | (2006.01) |
| H04N 17/00 | (2006.01) |

(52) U.S. Cl.
CPC .......... H04N 7/035 (2013.01); H04N 5/2173 (2013.01); H04N 5/2352 (2013.01); H04N 5/23206 (2013.01); H04N 7/181 (2013.01); H04N 17/002 (2013.01)

(58) Field of Classification Search
CPC .. H04N 7/035; H04N 5/2173; H04N 5/23206; H04N 5/2352; H04N 7/181; H04N 17/002

USPC .......................................... 348/223.1–229.1
See application file for complete search history.

(56) References Cited

U.S. PATENT DOCUMENTS

| | | | |
|---|---|---|---|
| 8,243,089 B2 | 8/2012 | Marks et al. | |
| 8,611,660 B2 | 12/2013 | Finlayson et al. | |
| 8,890,959 B2 | 11/2014 | Carlsson | |
| 8,953,094 B2 | 2/2015 | Baer | |
| 2003/0206231 A1 | 11/2003 | Chen et al. | |
| 2009/0172756 A1 | 7/2009 | Wheatley et al. | |
| 2010/0310190 A1* | 12/2010 | Lin ................. | H04N 5/35509 |
| | | | 382/260 |

(Continued)

FOREIGN PATENT DOCUMENTS

| | | |
|---|---|---|
| CN | 101835041 A | 9/2010 |
| CN | 103093452 A | 5/2013 |

(Continued)

*Primary Examiner* — Yogesh K Aggarwal
(74) *Attorney, Agent, or Firm* — Snyder, Clark, Lesch & Chung, LLP

(57) ABSTRACT

There is provided a method performed by a device in a network camera system. First and second encoded image data representing the same scene are received (S02, S04) over a network. The first and the second encoded image data are collected under the same light condition, albeit using different camera parameters. In particular, the second encoded image data is collected using camera parameters which simulate that the second encoded image data is collected under a darker light condition. A ratio of received data amount per time unit of the first encoded image data to received data amount per time unit of the second encoded image data is determined (S06) and the ratio is then used (S08) as an indication of a level of noise in the first encoded image data.

15 Claims, 3 Drawing Sheets

(56) References Cited

U.S. PATENT DOCUMENTS

| | | | |
|---|---|---|---|
| 2012/0002000 A1 | 1/2012 | Guerrero | |
| 2014/0028861 A1* | 1/2014 | Holz | H04N 5/23277 |
| | | | 348/208.4 |
| 2014/0205193 A1* | 7/2014 | Umezu | H04N 5/2355 |
| | | | 382/169 |
| 2014/0270487 A1 | 9/2014 | Park | |
| 2017/0142354 A1* | 5/2017 | Hitomi | H04N 5/357 |

FOREIGN PATENT DOCUMENTS

| | | |
|---|---|---|
| CN | 103279950 A | 9/2013 |
| EP | 2804382 A1 | 11/2014 |
| JP | 2006229475 A | 8/2006 |
| WO | 2007109856 A1 | 10/2007 |

\* cited by examiner

METHOD AND DEVICE IN A CAMERA NETWORK SYSTEM

RELATED APPLICATION

This application claims priority to European Application No. 16169770.1 filed May 16, 2016, which is incorporated by reference herein.

TECHNICAL FIELD

The present invention relates to the field of network camera systems. In particular it relates to a method, a device, and a system which provide an indication of a level of noise in encoded image data.

BACKGROUND

A network camera system may comprise a plurality of cameras which are connected in a network. The cameras in the network may capture image streams, i.e., sequences of frames of image data, which are transmitted over the network to a server. The server may e.g. request image streams from the cameras, receive the image streams, and store the image streams. The cameras typically encode, and sometimes even encrypt, the image streams prior to transmitting them over the network to the server. Thus, the server does not have access to the original image data captured by the camera, but only an encoded version of it.

For various applications, it is interesting to have a measure of the level of noise in image data. For example, the level of noise in image data may be used to define if it is day or night in the images, since the level of noise in the image data typically increases under dark light conditions.

It is known that the signal-to-noise ratio (SNR) may be used as an indicator of the level of noise in an image. However, in order to calculate the SNR, which is a measure of the level of a desired signal in relation to the level of background noise, the image data needs to be at hand. The SNR cannot therefore be applied directly on encoded image data received at the server of the network camera system without first decoding the image data.

There is thus a need for improvements.

SUMMARY OF THE INVENTION

In view of the above, it is thus an object of the present invention to mitigate the above drawbacks of the prior art and provide a method, device, and a system which allows an indication of the level of noise in image data to be determined directly from encoded image streams.

According to a first aspect of the invention, the above object is achieved by a method performed by a device in a network camera system, comprising:

receiving, over a network, first encoded image data representing a scene, the first encoded image data being collected by a camera under a first light condition using first camera parameters, receiving, over the network, second encoded image data representing the same scene, the second encoded image data being collected by the camera under the first light condition using second camera parameters which are different from the first camera parameters in that they are modified to increase a level of noise in image data collected by the camera, thereby simulating that the second encoded image data is collected under a second, darker, light condition, determining a ratio of received data amount per time unit of the first encoded image data to received data amount per time unit of the second encoded image data, and using the ratio as an indication of a level of noise in the first encoded image data.

With this method, first and second encoded image data representing the same scene are thus received over a network. The first and the second encoded image data are collected under the same light condition, albeit using different camera parameters. In particular, the second encoded image data is collected using camera parameters which simulate that the second encoded image data is collected under a darker light condition. In other words, the second encoded image data is collected under a first light condition, but due to the selection of the second camera parameters the second encoded image data will have the noise level of an image being collected by the camera under a second, darker, light condition.

In order to simulate the darker light condition, the second camera parameters are selected such that the level of noise in image data collected by the camera using the second camera parameters is increased compared to the level of noise in image data collected by the camera using the first camera parameters. In this respect, it is worth noticing that the level of noise in the collected images does not increase linearly with the change of the camera parameters. After a while, the noise will start to saturate, meaning that the level of noise will not increase further although the camera parameters are changed to this effect. With this arrangement, the second encoded image data is thus known to correspond to a high level of noise, or even to a saturated level of noise, as defined by the level of noise at the darker light condition.

An idea of the invention is to use the second encoded image data as a benchmark for a high level of noise or even a saturated level of noise, i.e., the level of noise that would be obtained under a darker light condition. Thus, by comparing the first encoded image data to the second encoded image data (as further described next), an indication of the level of noise in the first encoded image data may be achieved.

It has further been realized that, upon encoding image data, the level of noise in the image data greatly influences the size of the encoded image data, and thereby the bit rate required for transmitting the encoded image data over the network. The level of noise in the image data may approximately be proportional to the size of the encoded image data. This is due to the fact that the coding efficiency is influenced by the level of noise in the image data. The method therefore proposes to measure the level of noise in the encoded image data in terms of received data amount per time unit. In particular, the ratio between received data amount per time unit of first encoded image data and received data amount per time unit the second encoded image data is used as an indication of the level of noise in the first encoded image data. The higher the ratio, the higher the level of noise in the first encoded image data. The ratio will typically be a number between zero and one.

As a result, the first and the second encoded image data need not be decoded in order to get an indication of the level of noise in the first encoded image data.

It is further noted that the proposed method works equally well in a situation where the first and the second encoded image data are encrypted. The received first and second encoded, and encrypted, image data need neither be decrypted nor decoded for application of the method in order to get an indication of the level of noise in the first encoded (and encrypted) image data.

By encoded image data is generally meant an encoded stream of images.

By the scene being the same includes that the conditions in the scene, "the scene conditions", are the same. This includes e.g. that the level of motion in the scene is similar, that the illumination in the scene is similar, that no part of the scene is obscured in one case, but not in the other etc. For example, if the scene is a road, the amount of traffic should be the same when collecting the first and the second encoded image data. By the scene being the same further includes that the camera is directed in the same way when collecting the first and the second encoded image data.

By light condition is generally meant the level of light in the scene as seen by the camera.

By a level of noise in the first encoded image data is generally meant the level of noise in the image data prior to encoding.

Received data amount per time unit may e.g. be measured in terms of number of bits per time unit.

The ratio may be determined in different ways. For example, the ratio may be determined by comparing a bandwidth needed for transmitting the first encoded image data and the second encoded image data, respectively, over the network. More specifically, a ratio may be formed between a bandwidth needed for transmitting the first encoded image data over the network and the bandwidth needed for transmitting the second encoded image data over the network. This is advantageous in that the bandwidth measurement is readily available. The bandwidth for the transmittal of the first encoded image data and the second encoded image data may thus be measured and compared in order to determine the ratio of received data amounts per time unit.

The ratio may also be determined by comparing rates at which the first encoded image data and the second encoded image data, respectively, are written to a storage space. More specifically, a ratio may be formed between the rate at which the first encoded image data is written to a storage space and the rate at which the second encoded image data is written to a storage space. This is advantageous in that the rate for writing to the storage is readily available. The rate required to write the first encoded image data to a storage, and the rate required to write the second encoded image data to a storage, may thus be measured and compared in order to determine a ratio of received data amounts per time unit.

The step of using the ratio as an indication of a level of noise in the first encoded image data may further comprise: checking if the ratio is larger than a predefined threshold, and if so determining that an action needs to be taken in order to reduce the level of noise in future image data representing the scene collected by the camera under the first light condition using the first camera parameters.

As further explained above, the ratio is indicative of the level of noise in the first encoded image data—the larger the ratio, the higher the noise level. If the ratio is larger than a predefined threshold (which typically is a number between zero and one), the noise level is thus found to be high, i.e. at a similar level as in the second encoded image data. If such a situation is encountered, it may be determined that an action needs to be taken in order to reduce the level of noise in future image data. In this way, one may thus detect a high noise level in the first encoded image data and take appropriate action to reduce the level of noise in future image data.

A high level of noise in the first encoded image data may be caused by different factors. For example, the high level of noise may be due to the fact that there is not enough lighting in the scene. In more detail, if the level of noise in the first encoded image data is comparable to the level of noise in the second encoded image data (which simulate a darker light condition), one may draw the conclusion that the first light condition is close to the simulated darker light condition. To deal with this situation, the step of determining that an action needs to be taken may comprise: determining that additional lighting is needed in the scene when the camera uses the first camera parameters to collect image data of the scene under the first light condition. In this way, the method may thus be used to draw conclusions about the first light condition, and, in particular, that the scene would benefit from additional lighting.

According to another example, the high level of noise may be indicative of that the camera needs maintenance. The step of determining that an action needs to be taken may thus comprise determining that the camera needs maintenance.

The maintenance may for instance comprise maintenance of a cooling system of the camera. If the cooling system of the camera does not work properly, the camera will be too warm, which in turn leads to noisier images.

The maintenance may comprise replacement of a lamp in the camera. A defect lamp, which was supposed to illuminate the scene, results in a poor illumination of the scene, which in turn leads to noisier images.

The maintenance may comprise cleaning or replacing a housing or a lens of the camera. A dirty housing or a lens may result in noisy images.

The method may further comprise selecting the predefined threshold depending on the scene. For example, the predefined threshold may be selected depending on a level of motion in the scene. The predefined threshold may also be set to depend on how much the level of motion in the scene varies. For example, a static scene (such as a shop after closing hour) may have a lower threshold than a scene in which there is motion. Further a scene having a constant level of motion (such as a highway) may have a lower threshold than a scene in which the level of motion varies (such as at a pedestrian crossing). In this way, the method may be adapted to different scenes and different conditions in the scene, such as different levels of motion.

The first and the second camera parameters may comprise at least one of gain, aperture, and exposure time. These are parameters which influence the level of noise in image data. Further, the second camera parameters may be different from the first camera parameters in that they are modified to increase at least one of gain, aperture, and exposure time. In this way, the second parameters may be modified to increase the level of noise, thereby simulating a darker light condition.

According to a second aspect of the invention, the above object is achieved by a computer program product comprising a (non-transitory) computer-readable medium with computer code instructions for carrying out the method according to the first aspect when executed by a device having processing capability.

According to a third aspect of the invention, the above object is achieved by a device comprising:

a receiver configured to receive, over a network, first encoded image data representing a scene, the first encoded image data being collected by a camera under a first light condition using first camera parameters, and second encoded image data representing the same scene, the second encoded image data being collected by the camera under the first light condition using second camera parameters which are different from the first camera parameters in that they are modified to increase a level of noise in image data collected by the camera, thereby simulating that the second encoded image data is collected under a second, darker, light condition, and a processing component configured to determine a ratio of received data amount per time unit of the first encoded image data and a ratio of received data amount per time unit of the second encoded image data, and use the ratio as an indication of a level of noise in the first encoded image data.

The processing component may further be configured to: check if the ratio is larger than a predefined threshold, and if so, determine that an action needs to be taken in order to reduce the level of noise in future image data representing the scene collected by the camera under the first light condition using the first camera parameters.

The processing component may be configured to: determine that additional lighting is needed in the scene when the camera uses the first camera parameters to collect image data of the scene under the first light condition.

According to a fourth aspect of the invention, the above object is achieved by a network camera system comprising:

a device according to the third aspect, and a camera connected to the device via a network, the camera being configured to:

collect first encoded image data representing a scene, the first encoded image data being collected under a first light condition using first camera parameters, and collect second encoded image data representing the scene, the second encoded image data being collected under the first light condition using second camera parameters which are different from the first camera parameters in that they are modified to increase a level of noise in image data collected by the camera, thereby simulating that the second encoded image data is collected under a second, darker, light condition, and transmit the first and the second encoded image data to the device over the network.

The second, third, and fourth aspects may generally have the same features and advantages as the first aspect. It is further noted that the invention relates to all possible combinations of features unless explicitly stated otherwise.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF EMBODIMENTS

The present invention will now be described more fully hereinafter with reference to the accompanying drawings, in which embodiments of the invention are shown. The systems and devices disclosed herein will be described during operation.

Figure 1:
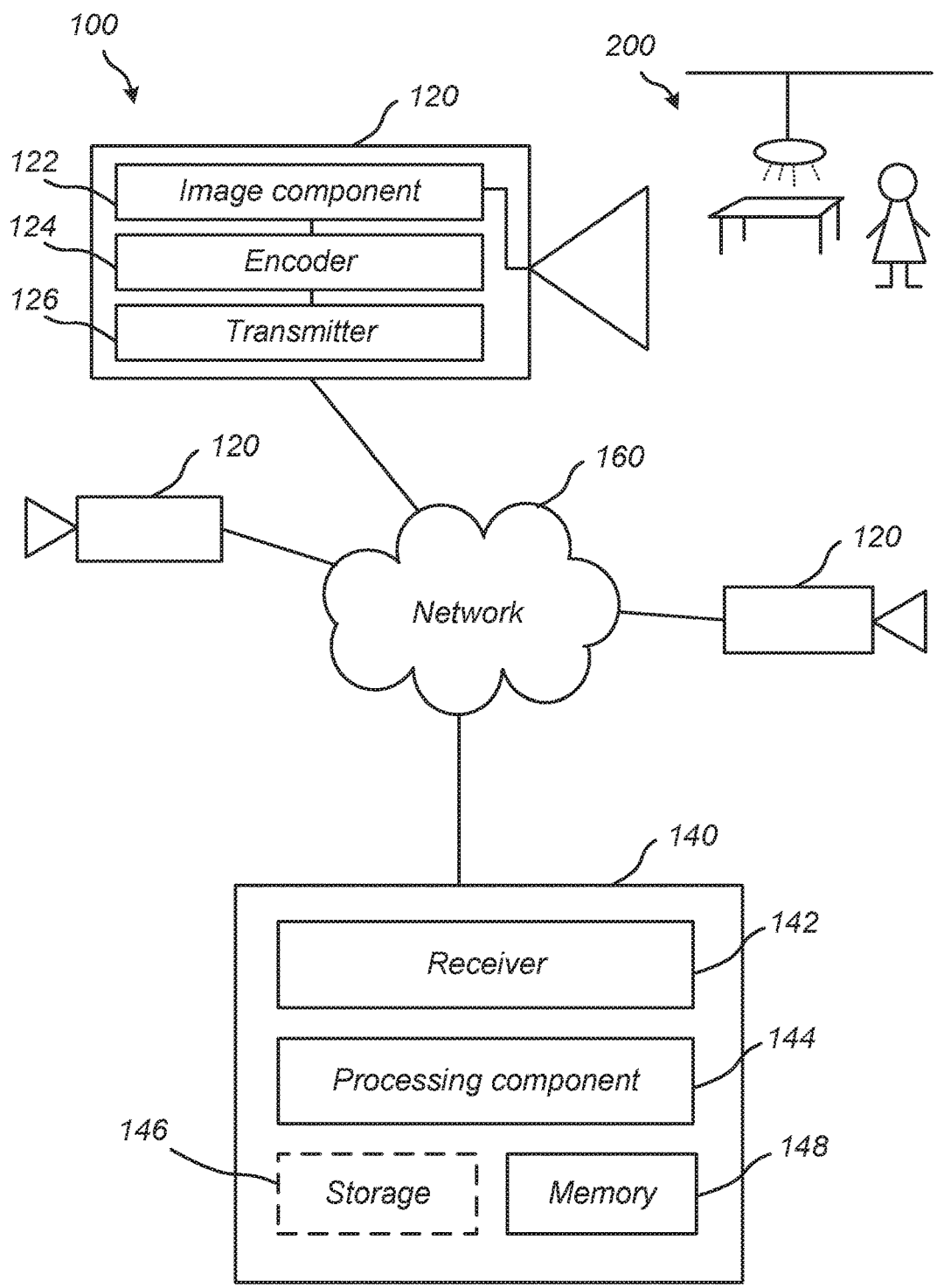
FIG. 1 illustrates a network camera system according to embodiments.

FIG. 1 illustrates a network camera system 100. The system 100 comprises one or more cameras 120 which are connected to a device 140, which may typically be a server, via a network 160.

Each camera 120 is configured to capture images of a scene 200 in the form of a stream of images (i.e. a video sequence). For this purpose the camera comprises an image component 122 which processes raw sensor data to produce image data of the scene 200. The camera 120 further comprises an encoder 124 which is configured to encode the image data of the scene 200 to produce encoded image data. The camera 120 further comprises a transmitter 126 for transmitting the encoded image data, i.e., an encoded stream of images, over the preferably wireless network 160 to the device 140. In other words, the camera 120 is configured to collect encoded image data representing the scene 100 and transmit the encoded image data to the device 140 over the network 160. The camera 120 and its components are conventional and will therefore not be discussed in more detail.

The camera 120 may collect encoded image data representing the scene 200 using camera parameters. The camera parameters may for example comprise one or more of gain, aperture, and exposure time. These camera parameters may influence the level of noise in the encoded image data. In more detail, a higher value of gain/and or exposure time will typically result in a higher level of noise in the image data. The camera parameters may be directly or indirectly set. By being directly set means that the parameter value itself may be set. By being indirectly set means that the parameter value is indirectly set via, for instance, an auto-focus procedure as known in the art. In such an auto-focus procedure, the parameter values may be modified by setting maximum and minimum values of the camera parameters.

The scene 200 may be associated with different conditions, referred to herein as scene conditions. In particular, the scene 200 may be associated with a light condition. By light condition is meant the level of light in the scene as seen by the camera 120. Another example of a scene condition is the level of motion in the scene.

Generally, the device 140, which may be a server, may be configured to receive encoded image data, i.e., streams of encoded image data, from the cameras 120 over the network 160. The device 140 is further configured to process the received encoded image data, and to write the received encoded image data to a storage. For these purposes, the device 140 comprises a receiver 142, a processing component 144 (a processor), and a memory 148. The memory 148 may constitute a non-transitory computer readable medium for storing computer code instructions to be executed by the processing component 148. For example, the memory 148 may store computer code instructions for carrying out any method disclosed herein.

The device 140 may further comprise a storage 146 to which encoded image data may be written. Alternatively, the storage may be located in another device in the network, such as in a server or a database.

The device 140 may be configured to verify the installation of the network camera system 100. In order to carry out such verification, the device 140 may run a number of tests on the camera network system. Each test may include performing an image data streaming and image data recording (storage) simulation for a given network and camera configuration, i.e., for given camera parameters.

A first test may comprise the device 140 instructing one of the cameras 120 to collect image data of the scene 200 under a first light condition, such as at day time, using first camera parameters. The first camera parameters are those parameters used in the installation of the network camera system 100. The first camera parameters may be factory default camera parameters, manually set parameters, or parameters set by an algorithm, such as parameters which would automatically be set by an auto-focus process under the first light condition. The device 140 then receives encoded image data of the scene 200, and records it, i.e. writes the encoded image data to the storage 146. During the test, different parameters may be measured, such as bandwidth usage and the rate at which the encoded image data is written to the storage 146.

A second test may comprise the device 140 instructing the (same) camera 120 to collect image data of the same scene 200 under the first light condition, using second camera parameters. The camera 120 is directed in the same way when collecting image data in the first and the second test. The second camera parameters may be altered to simulate a darker light condition, such as a night time condition. The device 140 then receives encoded image data of the scene 200, and records it, i.e. writes the encoded image data to the storage 146. Similar to the first test, different parameters may be measured, such as bandwidth usage and the rate at which the encoded image data is written to the storage 146.

The methods disclosed herein may be performed in connection to the installation verification process described above. In particular, the methods disclosed herein make use of the results of the first and the second tests run during the installation verification, for example for the purposes of detecting whether additional lighting is needed in the scene 200. The methods disclosed herein may also be run on regular intervals to verify that the installation is still optimal and has not deteriorated.

The operation of the camera network system will be described in the following with reference to FIG. 1 and the flow chart of FIG. 2.

In step S02, the device 140 runs a first simulation corresponding to the first test described above. In more detail, the device 140, via receiver 142, receives first encoded image data representing the scene 200 from one of the cameras 120. The first encoded image data, which is in the form of an encoded stream of images, is collected by the camera 120 and sent to the device 140 over the network 160. When the first encoded image data is collected by the camera 120, the scene 200 is subject to a first light condition, meaning that there is a certain level of light in the scene 200 as seen by the camera 120. For example, the first encoded image data may be collected when the scene 200 is in its normal state, i.e., under a light condition at which the camera 120 is intended to be used.

The first encoded image data is collected by the camera 120 using first camera parameters. The first camera parameters are those parameters that the camera 120 normally uses under the first light condition. For example, the first camera parameters may be default values, e.g. default values of gain, exposure time, and aperture. These values may be set directly or indirectly, for instance via an auto-focus procedure as explained above or other controlling processes or manually by a user.

In step S04, the device 140 runs a second simulation corresponding to the second test described above. In more detail, the device 140, via receiver 142, receives second encoded image data representing the same scene 200 from the same camera 120. The second encoded image data, which is in the form of a stream of encoded images, is collected by the camera 120 and sent to the device 140 over the network 160.

The second encoded image data is, similarly to the first encoded image data, also collected by the camera 120 when the scene 200 is subject to the first light condition. This may for example be achieved by collecting the first and the second encoded image data within a time window, meaning that they are collected close in time, or at time points at which the scene 200 is subject to the same first light condition, such as at the same time of the day.

Preferably not only the light condition is the same when the first and the second encoded image data are collected, but generally also the scene condition. This includes for instance that also the level of motion in the scene, or the variability of the level of motion, is the same when collecting the first and the second encoded image data. This since also the level of motion in the scene may influence the level of noise in the image data.

In contrast to the first encoded image data, the second encoded image data is collected by the camera 120 using second camera parameters. The second camera parameters are modified with respect to the first camera parameters to simulate a darker light condition. This may for example be achieved by increasing at least one of gain, aperture and exposure time of the camera 120, either directly, or by modifying parameters of the auto-focus process. Such a modification of the parameters will add noise to the collected image data. As a result, the size of the second encoded image data increases compared to the first encoded image data, which in turn will influence the bandwidth needed for transmitting the second encoded image data over the network 160. It will also cause an increase in the rate for writing the second encoded image data to a storage compared to the rate for writing the first encoded image data to a storage. Thus, in conclusion, the modification of the parameters will cause the received data amount per time unit to be larger for the second encoded image data compared to the first encoded image data.

Steps S02 and S04 may be triggered by the device 140 requesting the camera 120 to collect and transmit encoded image data of the scene 200 using the first camera parameters and the second camera parameters, respectively.

In step S06, the processing component 144 of the device 140, determines a ratio of received data amount per time unit of the first encoded image data to received data amount per time unit of the second encoded image data.

When running the first simulation, step S02, and the second simulation, step S04, the processing component 144 may monitor different parameters. For example, the processing component may monitor bandwidth usage and/or the rate at which the encoded image data is written to the storage 146. In this way, the processing component 144 may get an estimate of the received data amount per time unit of the received first and second encoded image data. Using these values, the processing component 144 may determine the ratio of received data amount per time unit of the first encoded image data to the ratio of received data amount per time unit of the second encoded image data. The ratio may for example be calculated by dividing the bandwidth used when transmitting the first encoded image data over the network with the bandwidth used when transmitting the second encoded image data over the network. According to another example, the ratio may be calculated by dividing the rate at which the first encoded image data is written to a storage space with the rate at which the second encoded image data is written to a storage space.

As discussed above, the received data amount per time unit will typically be larger for the second encoded image data compared to the first encoded image data due to an increased level of noise caused by the second camera parameters simulating a darker light condition. However, it is not known how much larger it will be in relation to the received data amount per time unit of the first encoded image data, since this depends on the level of noise in the first encoded image data. For example, suppose that the first encoded image data has a high level of noise, for instance due to poor illumination in the scene. As described above, modifying the first camera parameters will cause the second encoded image data to have an increased level of noise. However, adding noise to an already noisy image may result in that the final level of noise is not increased very much in the end—the level of noise saturates at some point. In conclusion, the ratio of received data amounts per time unit may thus be used to indicate the level of noise in the first encoded image data.

In step S08, the processing component 144 therefore uses the ratio of received data amounts per time unit as an indication of the level of noise in the first encoded image data. A larger ratio generally indicates a higher level of noise than a smaller ratio.

Figure 2:
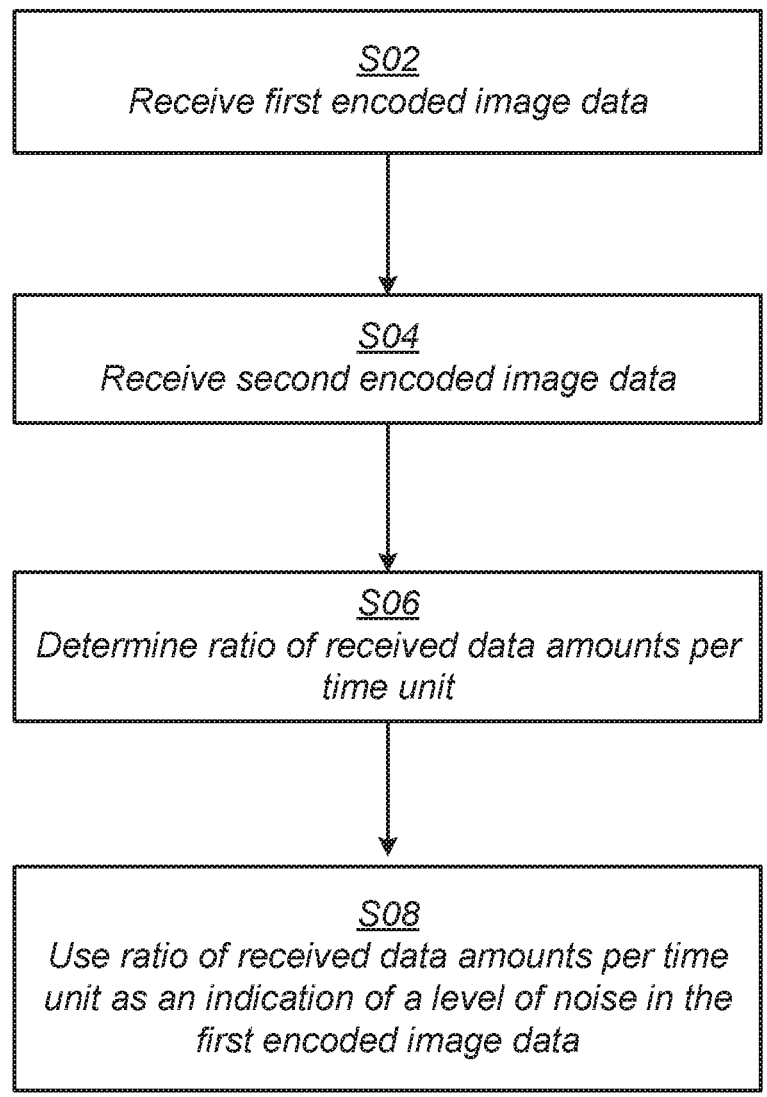
FIG. 2 is a flow chart of a method according to embodiments.
Figure 3:
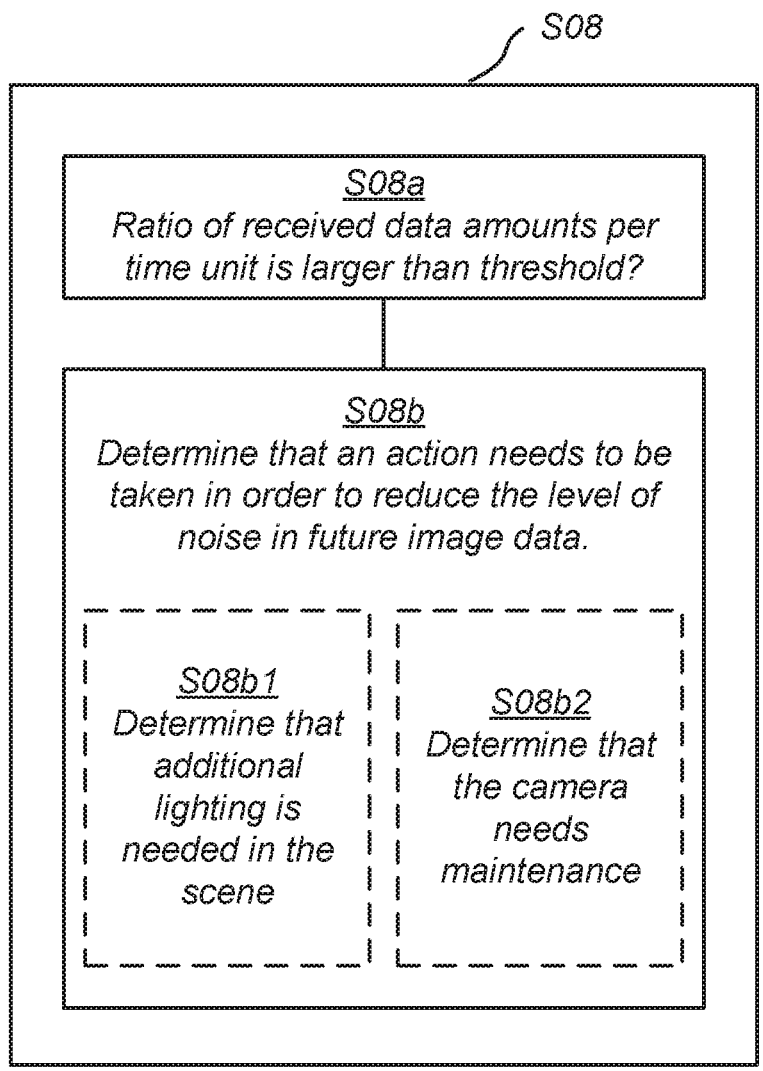
FIG. 3 is a flow chart illustrating further embodiments of the method of FIG. 2.

FIG. 3 illustrates embodiments of step S08 of the method of FIG. 2. Generally, the processing component 144, in step S08a, checks if the ratio of received data amounts per time unit is larger than a threshold.

The threshold may be pre-defined in the system, although different thresholds may be used depending on the scene. For example, in a static scene the threshold may be smaller than in a scene comprising motion. Alternatively, the threshold may be set by a user. By way of example, the threshold may be equal to 0.2 for a static scene (such as a in a shop after closing hours). The threshold may also be equal to 0.2 for a scene where the level of motion is constant (such as when the scene is a highway). The threshold may be equal to 0.5 if the level of motion in the scene is variable (such as at a pedestrian crossing).

If the ratio of received data amounts per time unit is larger than the threshold, the processing component 144, in step S08b, proceeds to determine that an action needs to be taken in order to reduce the level of noise in future image data collected by the camera under the first light condition using the first camera parameters. Since larger value of the ratio generally indicates a higher level of noise in the first encoded image data, the processing component 144 may in this way make a decision that the level of noise is unacceptably high, and that an action needs to be taken to reduce the level of noise in the future.

The unacceptably high level of noise in the first encoded image data may be due to different reasons.

For example, the high level of noise in the first encoded image data may be due to a poor illumination in the scene. A high level of noise in the first encoded image data may thus indicate that additional lighting is needed in the scene 200. According to an embodiment, the device processing component 144 may therefore, in step S08b1, determine that additional lighting is needed in the scene 200 when the camera 120 uses the first camera parameters to collect image data of the scene 200 under the first light condition.

According to another example, the high level of noise in the first encoded image data may be due to a fault condition in the camera 120. A high level of noise in the first encoded image data may thus indicate that the camera 120 needs maintenance. According to an embodiment, the processing component 144 may therefore, in step S08b2, determine that the camera 120 needs maintenance. The maintenance of the camera 120 may include maintenance of the cooling system of the camera 120. This since a defect cooling of the camera 120 may result in noisier images. The maintenance may include replacement of a lamp in the camera 120. If a lamp which is supposed to illuminate the scene 200 is broken, there is less illumination in the scene 200, which may result in noisier images. Another example of maintenance is cleaning or replacing of a housing or a lens of the camera 120. A dirty or worn housing or lens of the camera 120 may result in noisier images.

It will be appreciated that a person skilled in the art can modify the above-described embodiments in many ways and still use the advantages of the invention as shown in the embodiments above. For example, a high level of noise in the first encoded image data may indicate that the wrong type of camera 120 was installed in view of external conditions at the installation site. For example, a camera 120 which lacks cooling may have been installed by mistake. A camera 120 may have been installed which does not operate at the temperatures at the installation site, or which does not let in enough light in view of the light conditions at the installation site, or which does not operate at the humidity conditions at the installation site. Thus, the invention should not be limited to the shown embodiments but should only be defined by the appended claims. Additionally, as the skilled person understands, the shown embodiments may be combined.

The invention claimed is:

1. A method performed by a device in a network camera system, comprising:
    receiving, over a network, first encoded image data representing a scene, the first encoded image data being collected by a camera under a first light condition using first camera parameters,
    receiving, over the network, second encoded image data representing the same scene, the second encoded image data being collected by the camera under the first light condition using second camera parameters which are different from the first camera parameters in that they are modified to increase a level of noise in image data collected by the camera, thereby simulating that the second encoded image data is collected under a second, darker, light condition,
    determining a ratio of received data amount per time unit of the first encoded image data to received data amount per time unit of the second encoded image data, and
    using the ratio as an indication of a level of noise in the first encoded image data.

2. The method of claim 1, wherein the ratio is determined by comparing a bandwidth needed for transmitting the first encoded image data and the second encoded image data, respectively, over the network.

3. The method of claim 1, wherein the ratio is determined by comparing rates at which the first encoded image data and the second encoded image data, respectively, are written to a storage space.

4. The method of claim 1, wherein the step of using the ratio as an indication of a level of noise in the first encoded image data comprises:
    checking if the ratio is larger than a predefined threshold, and if so
    determining that an action needs to be taken in order to reduce the level of noise in future image data representing the scene collected by the camera under the first light condition using the first camera parameters.

5. The method of claim 4, wherein the step of determining that an action needs to be taken comprises:
    determining that additional lighting is needed in the scene when the camera uses the first camera parameters to collect image data of the scene under the first light condition.

6. The method of claim 4 wherein the step of determining that an action needs to be taken comprises determining that the camera needs maintenance.

7. The method of claim 6, wherein the maintenance comprises maintenance of a cooling system of the camera, replacement of a lamp in the camera, or cleaning or replacing a housing or a lens of the camera.

8. The method of claim 4, further comprising selecting the predefined threshold depending on the scene.

9. The method of claim 1, wherein the first and the second camera parameters comprise at least one of gain, aperture, and exposure time.

10. The method of claim 9, wherein the second camera parameters are different from the first camera parameters in that they are modified to increase at least one of gain, aperture, and exposure time.

11. A non-transitory computer-readable medium with computer code instructions stored thereon for carrying out the method according to claim 1 when executed by a device having processing capability.

12. A device comprising:
a receiver configured to receive, over a network, first encoded image data representing a scene, the first encoded image data being collected by a camera under a first light condition using first camera parameters, and second encoded image data representing the same scene, the second encoded image data being collected by the camera under the first light condition using second camera parameters which are different from the first camera parameters in that they are modified to increase a level of noise in image data collected by the camera, thereby simulating that the second encoded image data is collected under a second, darker, light condition, and
a processing component configured to determine a ratio of received data amount per time unit of the first encoded image data to received data amount per time unit of the second encoded image data, and use the ratio as an indication of a level of noise in the first encoded image data.

13. The device of claim 12, wherein the processing component is further configured to:
check if the ratio is larger than a predefined threshold, and if so
determine that an action needs to be taken in order to reduce the level of noise in future image data representing the scene collected by the camera under the first light condition using the first camera parameters.

14. The device of claim 13, wherein the processing component is configured to:
determine that additional lighting is needed in the scene when the camera uses the first camera parameters to collect image data of the scene under the first light condition.

15. A network camera system comprising
a device according to claim 12, and
a camera connected to the device via a network, the camera being configured to:
collect first encoded image data representing a scene, the first encoded image data being collected under a first light condition using first camera parameters, and
collect second encoded image data representing the scene, the second encoded image data being collected under the first light condition using second camera parameters which are different from the first camera parameters in that they are modified to increase a level of noise in image data collected by the camera, thereby simulating that the second encoded image data is collected under a second, darker, light condition, and
transmit the first and the second encoded image data to the device over the network.

* * * * *